Jan. 13, 1970     J. R. METZ     3,488,815
QUICK RELEASE FASTENER
Filed Oct. 5, 1967
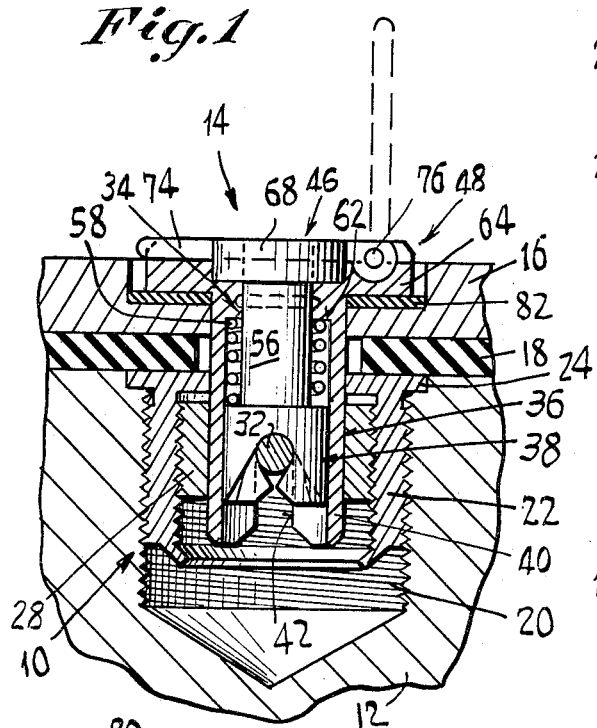
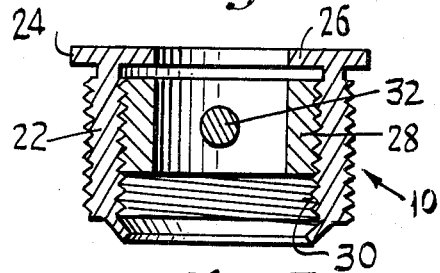
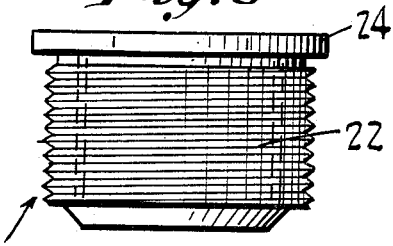
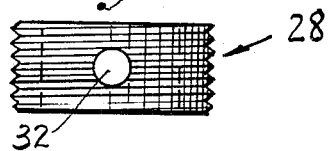
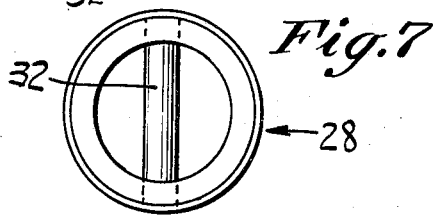
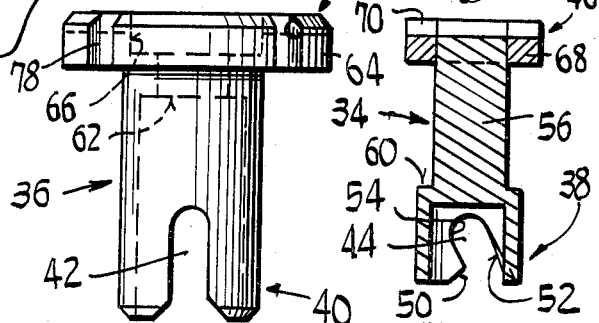
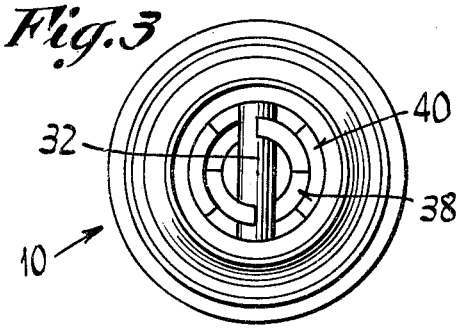
INVENTOR.
Joseph R. Metz
BY
*H. Gibner Lehmann*
AGENT

United States Patent Office 3,488,815
Patented Jan. 13, 1970

3,488,815
QUICK RELEASE FASTENER
Joseph R. Metz, Ridgefield, Conn., assignor to Norco, Inc., Ridgefield, Conn., a corporation of Connecticut
Filed Oct. 5, 1967, Ser. No. 673,039
Int. Cl. F16b 21/04
U.S. Cl. 24—211                                                6 Claims

ABSTRACT OF THE DISCLOSURE

A quick release fastener comprising a plug part and a receiver part, the latter including a cross bar disposed in the open end portion of a threaded bushing which is turnable in the threads of a socket-like anchorage member. The plug part comprises two relatively turnable, inner and outer telescoped members having registerable front end slots adapted to receive the cross bar. Slots in the front end of one member are parallel to the axis of the plug, and in the other member follow a helical curve whereby relative turning movement of the members is necessary to enable the cross bar to be received in or removed from the slots. A releasable lock means at the back end of the plug part can lock the telescoped members against turning. The plug part and cross bar with bushing functions like a screw to pull up tightly two panels. Releasing the lock means releases the plug part from the bushing and cross bar, permitting the panels to be quickly separated.

CROSS REFERENCES TO COPENDING APPLICATIONS (1) Copending application of Joseph R. Metz, Ser. No. 652,917 filed July 12, 1967, entitled "Locking Type Quick Release Fastener," having common ownership with the present application.

(2) Copending application of Joseph R. Metz, Ser. No. 660,415 filed Aug. 14, 1967, now U.S. Patent No. 3,407,455, entitled "Adjustable Locking Type Quick Release Fastener," having common ownership with the present application.

BACKGROUND

This invention relates to quick-release fastener devices, and more particularly to plug-and-socket type releasable fasteners where the plug comprises telescoped members differently notched at their forward ends to accept and lock to a cross bar of the socket or receiver.

Prior releasable fasteners of the kind indicated will not suit certain special situations where the fastener is required to be initially applied and tightened in the manner of a screw, having similar holding characteristics, and thereafter is to be instantly released, substantially as quickly as a snap fastener. Moreover, many prior fasteners intended for special purposes are seen to be complicated, to involve many parts, resulting in a costly construction.

SUMMARY

The above disadvantages and drawbacks of prior quick-release fasteners are obviated by the present invention, and one object of the invention is to provide a novel and improved fastener device which can be pulled up tightly in the manner of a screw and yet instantly and completely released at the desired time. This is accomplished by the provision of a threaded, socket-type receiver member and a multi-part plug assemblage cooperable with a screw-like member which is threaded into the receiver member. The plug assemblage includes a composite shank structure disposable in the screw-like member and which is quickly releasable therefrom. The shank structure has abutment means arranged for engagement with the instrumentality which is to be fastened in place, and when such structure is released from the screw-like member the instrumentality is freed as a consequence.

Other objects and features of the invention reside in the provision of an improved quick-release fastener as above set forth, which is at the same time simple in construction, small and compact, economical to fabricate, sturdy, strong and easy and reliable in operation.

Still other features and advantages will hereinafter appear.

In the drawings:

FIG. 1 is an axial sectional view of the quick-release fastener of the invention, shown in the process of securing two panel structures together in assembled relation.

FIG. 2 is a top plan (or rear) view of the fastener device, illustrating in addition a wrench used in effecting the tightening.

FIG. 3 is a bottom plan (or front) view of the fastener device per se.

FIG. 4 is an axial sectional view of the receiver assemblage of the fastener device.

FIG. 5 is a side elevational view of the outer threaded socket-like anchorage member of the receiver assemblage.

FIG. 6 is a side elevational view of a threaded bushing or screw-like member constituting a portion of the multi-part plug assemblage of the fastener device.

FIG. 7 is a top plan view of the screw-like member of FIG. 6.

FIG. 8 is a side elevational view of the outer member of the plug assemblage of the fastener device.

FIG. 9 is an axial sectional view of the inner member of the multi-part plug assemblage.

Referring first to FIG. 1, the fastener device is shown as having a receiver part designated generally by the numeral 10, which is secured in a supporting structure or base panel 12. The fastener device further comprises a plug part or assemblage designated generally by the numeral 14 which is shown as securing a top panel 16 to the base panel 12, there being a resilient, compressible gasket 18 interposed between the panels.

The base panel 12 has a threaded recess 20 into which there is screwed a threaded, annular socket-type receiver member 22 having at its outer end a pair of external and internal flanges 24 and 26 respectively. The receiver part 10 may be considered as additionally including an externally threaded bushing or screw-like member 28 which is accommodated by internal threads 30 of the receiver member 22. The bushing 28 is freely turnable in the receiver member 22 in the manner of a screw, whereby it will shift axially in response to its being turned in one direction or the other. The bushing 28 carries a cross bar or pin 32 which is diametrically disposed and extends into the side walls of the bushing, as seen in FIG. 7. The top panel 16 has an aperture and is countersunk to receive the plug part 14 as seen in FIG. 1. The plug part 14 comprises inner and outer relatively turnable telescoped members 34 and 36 respectively, said members having one set of corresponding forward end portions 38, 40 respectively provided with juxtaposed open-ended slot means arranged to have their openings at the forward ends (bottom as seen in FIG. 1) of the plug part and to receive the cross bar 32 therein. As shown in FIG. 8, the outer plug member 36 has a pair of slots 42 extending axially and substantially parallel to the axis of the plug part 14.

The slot means of the inner plug part 34 comprises two slots 44 which are diagonally disposed and extend substantially along a theoretical helix located about the axis of the plug part. The telescoped members 34, 36 have another (back) set of corresponding end portions 46, 48 respectively which are located in juxtaposition in each other and remote from the first set of end portions 38, 40. As seen in FIG. 1, certain inwardly located portions of the slot means of the members 34, 36 can be in registration so as to enable them to accommodate the cross bar 32, and for such condition the outwardly (or forwardly) located portions of the slot means will be out of registration, thereby to enable a locking of the cross bar to be effected in said slot means when the telescoped members 34, 36 are prevented from turning.

In order for the cross bar 36 to be received in the slot means of the plug part 14 as shown in FIG. 1, a relative turning of the telescoped members must occur from an initial position wherein the forward or outward portions of the slot means are in registration, as will be understood.

Referring to FIG. 9, the slots 44 of the inner member 34 have divergent mouth areas, with diverging edges 50, 52, and the rear portions of the slots 44 have edges 54 which are substantially parallel to the edges 52 and which meet the foremost edges 50.

The inner telescoped member 34 has a shank portion 56 of reduced diameter, about which there is disposed a helical compression coil spring 58 engaged with a shoulder 60 of the inner member and with an internal shoulder 62 of the outer member whereby the inner member is biased in a downward direction as viewed in FIG. 1.

The outer telescoped plug member 36 has an enlarged head portion 64 provided with a counterbore 66 in which there is received a fixed collar 68 of the inner member, acting as a stop against the action of the compression spring 58. Thus, the spring 58 tends to keep the inner and outer telescoped members in the relative axial positions shown in FIG. 1, and the said members are capable of relative turning movement with respect to each other, although frictionally restrained to some extent by the action of the spring and cooperable contacting surfaces.

When in the position shown in FIG. 1, the plug part 14 is held captive, being locked against removal from the receiver part 10 by virtue of the fact that it is prevented from releasing the cross bar 32.

This is because relative turning between the inner and outer plug members 34, 36 is prevented. For this purpose the upper or back end portion 46 of the inner plug member is provided with a diametric groove 70, and the head 64 of the outer plug member 36 is provided with a diametric groove 72. Arranged to be accommodated in the grooves 70, 72 is a locking bar or piece 74 which is carried by a pivot pin 76 disposed in the head 64. The full line showing of the locking piece 74 in FIG. 1 indicates how it occupies the grooves 70, 72 and prevents relative turning of the telescoped members 34, 36. In FIG. 1 a dotted line showing of the locking piece 74 is given, indicating that it has been swung upward from the full line position so as to remove it from the groove 70 of the inner telescoped member 34.

For the purpose of pulling up the fastener tightly so as to secure the top panel 16 to the base panel 12 and compress the resilient interposed gasket 18, the head 64 of the outer plug member 36 has a plurality of wrench notches 78 disposed in its periphery, to accommodate a C spanner wrench 80 as illustrated in FIG. 2.

Under the head 64 of the plug part, a sealing gasket 82 is provided to effect a fluid tight engagement with the top panel 16.

The operation of the quick-release fastener is as follows:

The lock-up procedure, by which the fastener is applied and by which it secures the top panel 16 to the base panel 12 involves first raising the locking piece or bar 72 to the broken line position illustrated in FIG. 1. This permits relative movement between the inner and outer plug members 34, 36. The plug part 14 as carried in the panel 16 is then applied to the receiver part 10 and tentatively turned until the cross bar 32 of the bushing 28 is received in the forward portions of the slots 42 of the outer plug member 36. The plug part 14 is now forced axially inward until the inner member 34 thereof turns with respect to the outer member the required amount to enable the cross bar 32 to be accommodated in the innermost portions of the slots 42, 44 in the manner shown in FIG. 1. When this has occurred, the continual force exerted by the spring 58 and the friction between the inner and outer plug parts 34, 36 will tend to retain the cross bar fully received in the slotted end portion of the plug part 14. The back end slots 70 and 72 of the plug part 14 will now be in alignment, and the locking piece 74 is swung downward to the locking position shown in FIGS. 1 and 2. When this has been effected, the plug part 14 will be securely held to the cross bar 32 and to the bushing 28 of the receiver part 10. The spanner wrench 80 is now utilized to screw inward the plug part 14, bringing the top panel 16 forcibly against and compressing the gasket 18. The fastener will now hold the panels 16 and 12 together in the same manner that a screw would hold them.

When it is desired to quickly and instantly separate the top panel 16 from the base panel 12 it is merely necessary to lift the locking piece 74 out of the groove 70 of the inner plug member 34, as by raising it to the broken line position shown in FIG. 1. The compressive force experienced by the gasket 18, reacting strongly against the top panel 16 will force the latter upward as viewed in FIG. 1 and the panel will carry with it the plug part 14, this being made possible by virtue of relative rotation occurring between the inner and outer plug members 34, 36. Such relative rotation enables the cross bar 32 to leave the slotted formations of the plug part whereupon the latter and the top panel 16 will be completely free without the necessity of doing any unscrewing whatsoever of the plug part.

It will now be understood from the foregoing that I have provided a novel and improved quick-release fastener which can be utilized to secure together two structural members in the same manner as a screw or bolt, with equivalent forces. However, at such time that the structural members are to be separated, the fastener can be instantly released by merely shifting a locking piece from its locking to its releasing position. The fastener device is seen to be relatively simple, involving few parts which may be economically fabricated and assembled. Further, the fastener device is capable of being sturdily constructed, and is reliable and foolproof in its operation.

Variations and modifications may be made within the scope of the invention, and portions of the improvements may be used without others.

I claim:

1. A quick-release fastener comprising, in combination;
   (a) a plug part adapted to be releasably attached to the cross bar of a receiver part, said plug part including inner and outer relatively turnable telescoped members,
   (b) said members having one set of corresponding forward end portions provided with juxtaposed open-ended slot means arranged to have their openings at the forward end of the plug part and to receive said cross bar therein,
   (c) one slot means extending axially and substantially parallel to the axis of the plug part, and the other slot means extending substantially along a theoretical helix disposed about said axis,
   (d) said telescoped members having another set of corresponding end portions located in juxtaposition to each other and remote from the first set, wherein the improvement comprises:
   (e) accessible, manually operable means disposed on said other set of corresponding end portions, for releasably locking the same to each other to releasably hold the members against turning and in relative positions wherein certain rearwardly located portions of the slot means are in registration to enable them to accommodate said cross bar and forwardly located positions are out of registration to lock an accommodated cross bar in said slot means,
(f) said one member having means disposed at its said corresponding end, engageable with a turning tool to enable the member to be forcibly turned.

2. A quick-release fastener as in claim 1, wherein:
(a) the corresponding end of said one member comprises a head enlargement,
(b) said tool-engageable means comprising recesses in the head enlargement.

3. A quick-release fastener comprising, in combination:
(a) a plug part adapted to be releasably attached to the cross bar of a receiver part, said plug part including inner and outer relatively turnable telescoped members,
(b) said members having one set of corresponding forward end portions provided with juxtaposed open-ended slot means arranged to have their openings at the forward end of the plug part and to receive said cross bar therein,
(c) one slot means extending axially and substantially parallel to the axis of the plug part, and the other slot means extending substantially along a theoretical helix disposed about said axis,
(d) said telescoped members having another set of corresponding end portions located in juxtaposition to each other and remote from the first set, wherein the improvement comprises:
(e) accessible, manually operable means disposed on said other set of corresponding end portions, for releasably locking the same to each other to releasably hold the members against turning and in relative positions wherein certain rearwardly located portions of the slot means are in registration to enable them to accommodate said cross bar and forwardly located positions are out of registration to lock an accommodated cross bar in said slot means,
(f) a receiver part comprising a tubular body adapted to be mounted on a carrier,
(g) a cross bar disposed substantially diametrically in said body, and
(h) means turnably mounting the cross bar in the body to enable it to assume any of a plurality of different substantially diametric positions.

4. A quick-release fastener as in claim 3, wherein:
(a) the means turnably mounting the cross bar comprises screw threads in the body whereby turning of the bar about the axis of the body shifts the bar laterally and along said axis.

5. A quick-release fastener as in claim 4, wherein:
(a) said body having external screw threads by which it can be screwed into a threaded carrier.

6. A quick-release fastener as in claim 4, and further including:
(a) a pair of spaced-apart structural members respectively engaged with said plug part and receiver part, and
(b) a compressible, resilient element disposed between and engaging said structural members, and biasing the same apart when the plug part is lockingly engaged with the receiver part.

References Cited

UNITED STATES PATENTS 2,318,123   5/1943   Segal.
2,560,513   7/1951   Lyon _____ 287—119 X BERNARD A. GELAK, Primary Examiner U.S. Cl. X.R.

24—221, 230